US009792496B2

(12) United States Patent
Susaki et al.

(10) Patent No.: US 9,792,496 B2
(45) Date of Patent: Oct. 17, 2017

(54) CASH PROCESSING APPARATUS

(71) Applicant: TOSHIBA TEC KABUSHIKI KAISHA, Shinagawa-ku, Tokyo (JP)

(72) Inventors: Akiko Susaki, Tokyo (JP); Tsuyoshi Gotanda, Tokyo (JP); Norifumi Shishido, Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/992,161

(22) Filed: Jan. 11, 2016

(65) Prior Publication Data

US 2016/0232406 A1 Aug. 11, 2016

(30) Foreign Application Priority Data

Feb. 6, 2015 (JP) ................................ 2015-022645

(51) Int. Cl.
*G06Q 40/00* (2012.01)
*G06K 9/00* (2006.01)
(Continued)

(52) U.S. Cl.
CPC ......... *G06K 9/00442* (2013.01); *G07D 7/187* (2013.01); *G07D 11/0084* (2013.01)

(58) Field of Classification Search
CPC ............... G06K 9/00442; G07D 11/00; G07D 11/0084; G07D 11/009; G07D 7/125
(Continued)

(56) References Cited

U.S. PATENT DOCUMENTS 7,978,899 B2 * 7/2011 Jenrick .................. G07D 7/162 209/534
8,276,733 B2 * 10/2012 Watanabe .............. G07D 7/164 194/206
(Continued)

FOREIGN PATENT DOCUMENTS

EP 1434176 6/2004
EP 2267666 12/2010
(Continued)

OTHER PUBLICATIONS

Japanese Office Action for Japanese Patent Application No. 2015-022645 dated Aug. 1, 2017.

*Primary Examiner* — Seung Lee
(74) *Attorney, Agent, or Firm* — Amin, Turocy & Watson LLP

(57) ABSTRACT

A cash processing apparatus includes a storage section, a money depositing conveyance module, a money dispensing conveyance module and an identification module. The storage section stores money by denominations for paying out. The money depositing conveyance module conveys money from a money depositing port to the storage section. The money dispensing conveyance module conveys money from the storage section to a money dispensing port. The identification module identifies the denomination of the money conveyed by the money depositing conveyance module and also detects stain of the money. The money depositing conveyance module collects the money of which stain is detected by the identification module to a collection section, and conveys the money of which no stain is detected by the identification module to the storage section by individual denominations.

12 Claims, 5 Drawing Sheets

(51) Int. Cl.
*G07D 11/00* (2006.01)
*G07D 7/187* (2016.01)

(58) Field of Classification Search
USPC .......................... 235/7 R, 379, 380; 902/8, 9
See application file for complete search history.

(56) References Cited

U.S. PATENT DOCUMENTS

| | | | | |
|---|---|---|---|---|
| 8,752,689 | B2 * | 6/2014 | Kagoshima ........ | G07D 11/0084 194/206 |
| 2004/0134981 | A1 * | 7/2004 | Voser ..................... | G07D 7/187 235/379 |
| 2012/0176605 | A1 | 7/2012 | Stoeckli et al. | |
| 2013/0256091 | A1 | 10/2013 | Kagoshima et al. | |

FOREIGN PATENT DOCUMENTS

| | | |
|---|---|---|
| JP | 03-054689 | 3/1991 |
| JP | 05-217053 | 8/1993 |
| JP | 10-149474 | 6/1998 |
| JP | 2000-099804 | 4/2000 |
| JP | 2006-120074 | 5/2006 |
| WO | 2009/128145 | 10/2009 |
| WO | 2012/090301 | 7/2012 |

* cited by examiner

CASH PROCESSING APPARATUS

CROSS-REFERENCE TO RELATED APPLICATION

This application is based upon and claims the benefit of priority from Japanese Patent Application No. 2015-022645, filed Feb. 6, 2015, the entire contents of which are incorporated herein by reference.

FIELD

Embodiments described herein relate generally to a cash processing apparatus.

BACKGROUND

Conventionally, a cash processing apparatus is known which is used together with an electronic equipment, such as a POS (Point Of Sales) terminal and an ECR (Electronic Cash Register), connected therewith. Such a cash processing apparatus selects money input from an input port by denominations, stores the selected money in a storage section and dispenses money stored in the storage section in response to a money dispensing instruction from the POS terminal. In such a cash processing apparatus, even if money with no stain is prepared in the storage section beforehand at a store side, if money having stain is received from a customer, money having much stain is dispensed as a change.

In a conventional technology, there is a cash processing apparatus which does not receive such seriously stained money that causes difficulty of identification in the denomination thereof and discharges the money with much stain from a reject section. However, there is also money that has no stain enough to be rejected and the denomination thereof can be identified, but is undesirable for the store to be dispensed to a customer as a change. In such a store, the store clerk removes the money having much stain when delivering a change to the customer and delivers money with less train selected by himself/herself to the customer. There are problems in which the customer has to wait for if a job of selecting money is added at the time of settlement and the determination standard in selecting money depends on store clerks.

DETAILED DESCRIPTION

A cash processing apparatus includes a storage section, a money depositing conveyance module, a money dispensing conveyance module and an identification module. The storage section stores money by denominations for paying out. The money depositing conveyance module conveys money from a money depositing port to the storage section. The money dispensing conveyance module conveys money from the storage section to a money dispensing port. The identification module identifies the denomination of the money conveyed by the money depositing conveyance module and also detects stain of the money. The money depositing conveyance module collects the money of which stain is detected by the identification module to a collection section, and conveys the money of which no stain is detected by the identification module to the storage section by individual denominations.

Figure 1:
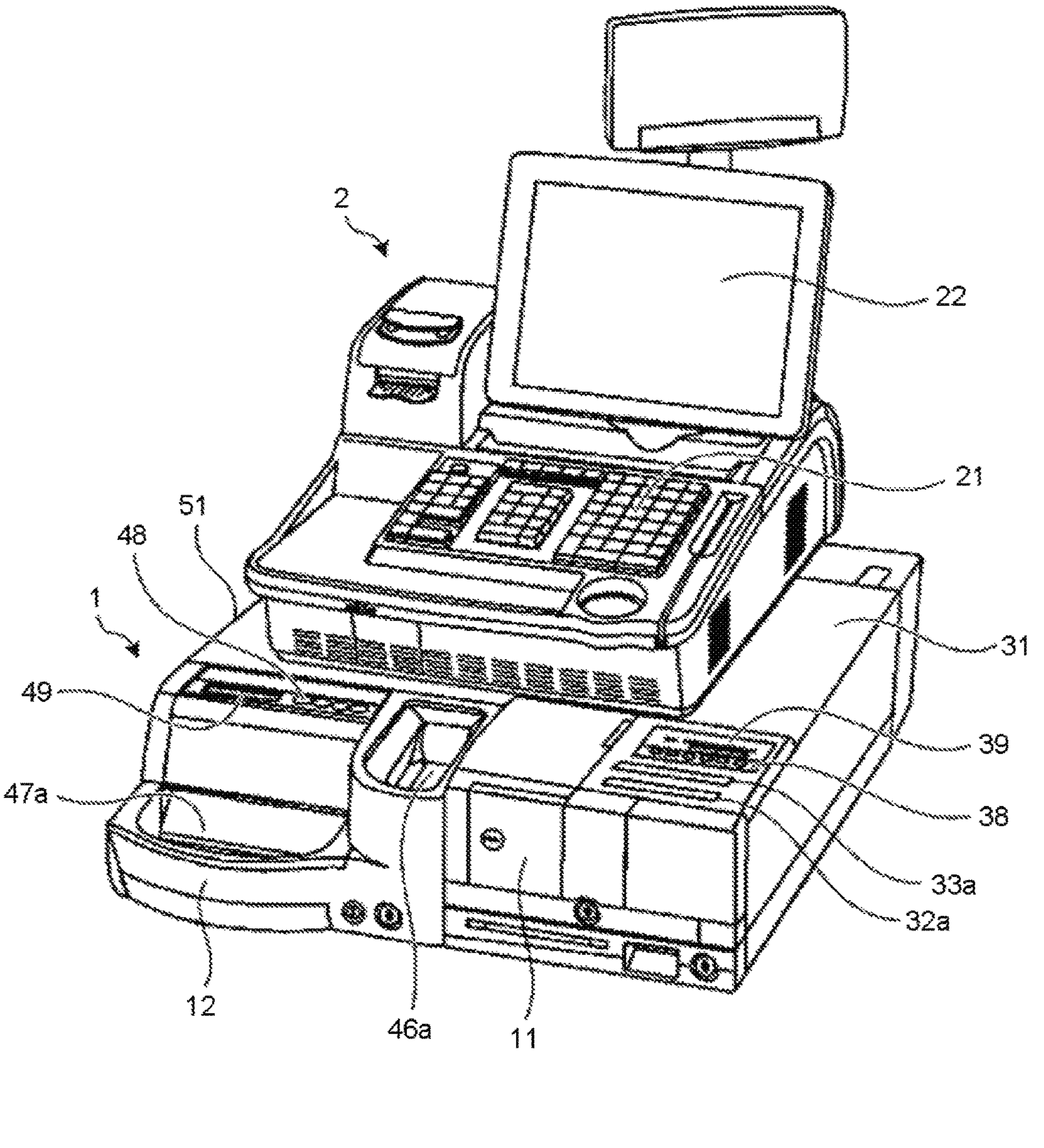
FIG. 1 is a perspective view illustrating appearances of a change machine and a POS terminal according to an embodiment.

FIG. 1 is a perspective view illustrating appearances of a change machine 1 and a POS terminal 2. In general, a plurality of POS terminals 2 each of which is assigned with a unique register number and arranged at a settlement area is arranged in a store. A cashier or store clerk uses the POS terminal 2 to carry out a sales processing. The POS terminal 2 is equipped with a keyboard 21, a display device 22 and a scanner 23 (refer to FIG. 4).

The change machine 1 includes a bill change machine 11 and a coin change machine 12. The bill change machine 11 identifies a bill to store it therein and dispenses the stored bill as change. The coin change machine 12 identifies a coin to store it therein and dispenses the stored coin as change.

The bill change machine 11 having a housing 31 is equipped with a money depositing port 32*a* and a money dispensing port 33*a* at the near side end part of the upper surface of the housing 31. Further, an operation key 38 and a display device 39 are arranged on the upper surface of the housing 31 at the far side of the money dispensing port 33*a*

The coin change machine 12 having a housing 51 is equipped with a money depositing port 46*a* through which a plurality of coins can be collectively put at the right-near end part of the upper surface of the housing 51. Further, the coin change machine 12 is also equipped with a money dispensing port 47*a* at the left-near end part of the housing 51 for dispensing coins from the coin change machine 12. An operation key 48 and a display device 49 are arranged on the upper surface of the housing 51.

Next, the structure of the bill change machine 11 is described in detail.

In a store that intends to improve its service quality, there is a need to arrange bills having less stain and wrinkles to hand over them to a customer. Hereinafter, an example is adopted to describe that the bill change machine 11 identifies bills having lots of stain and wrinkles to collect them.

Figure 2:
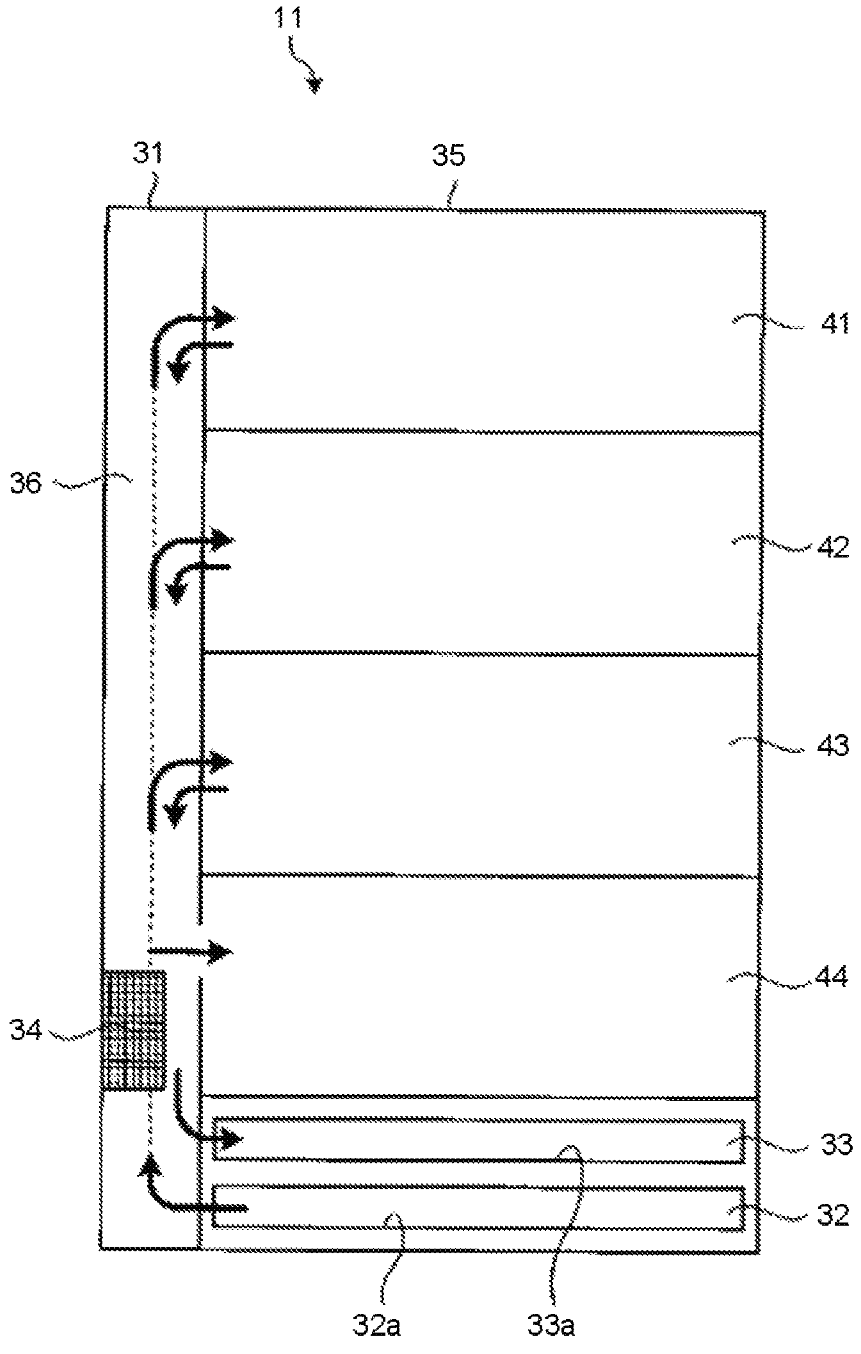
FIG. 2 is a plane view schematically illustrating the inside of a bill change machine.

FIG. 2 is a plane view illustrating the internal structure of the housing 31 of the bill change machine 11. The bill change machine 11 is equipped with an acquiring section 32 and a money dispensing section 33 in the housing 31. The bill change machine 11 is further equipped with an identification section 34, a storage section 35 and a conveyance section 36 inside the housing 31.

The acquiring section 32, which includes the money depositing port 32*a* formed on the housing 31, acquires a paper such as a bill inserted through the money depositing port 32*a* into the housing 31. The money dispensing section 33, which includes the money dispensing port 33*a* formed on the housing 31, dispenses a paper such as a bill from money dispensing port 33*a* as change.

The identification section 34 is arranged at a position close to the acquiring section 32 to determine authenticity and denomination of the bill on a conveyance belt to detect stain. The identification section 34 verifies whether or not the paper conveyed by the conveyance section 36 is a bill, and identifies its denomination if it is a genuine bill and then sums up the number of bills. The identification section 34 detects stain and wrinkles of the bill conveyed by the conveyance section 36. Hereinafter, the stain and wrinkles of bill are collectively referred to as “stain of bill”.

No specific limitation is given to the method for detecting the stain, as an example, stain of bill can be detected through a threshold value determination of an identification sensor 60 (refer to FIG. 3) of the identification section 34. For example, a method for detecting the stain is described in a case in which the identification section 34 emits light to the bill and uses a sensor (light receiving element) for receiving a reflected light from the bill as the identification sensor 60. In general, there is a tendency that the surface of a bill having less stain and wrinkles easily reflects light but the surface of a bill having lots of stain and wrinkles hardly reflects light. Thus, if the light receiving amount of reflected light from a bill is smaller than a specific threshold value, the identification section 34 determines that the bill is stained. Further, the identification section 34 may carry out a threshold value determination with respect to an average value of the light receiving amount or a value obtained by executing some numerical operations for the light receiving amount.

The threshold value may be stored in a storage device such as a ROM 52. Further, the threshold value may also be stored in a rewritable storage device, and the user can change (set) a detection level of the identification sensor 60 which determines the existence of stain through an operation from the operation key 38 (setting module). Then, the identification section 34 may detect stain of bill according to the set detection level.

The storage section 35 is equipped with a first storage box 41, a second storage box 42, a third storage box 43 and a collection cassette 44. The first storage box 41 stores a paper identified by the identification section 34 as a first denomination bill (for example, 1000-yen bill). The second storage box 42 stores a paper identified by the identification section 34 as a second denomination bill (for example, 5000-yen bill). The third storage box 43 stores a paper identified by the identification section 34 as a third denomination bill (for example, 10000-yen bill). It is exemplified that the storage section 35 is provided with three storage boxes for respectively storing three kinds of denominations; however, the number of denominations to be handled and the number of the storage boxes are not limited to three and may be below two or above four.

The collection cassette 44 is arranged detachably with respect to the housing 31 and is detached from the housing 31 after a lock mechanism (not shown) is released. The collection cassette 44 stores a bill transferred from the first storage box 41, the second storage box 42 or the third storage box 43 according to an instruction from the operation key 38. Further, the collection cassette 44 is a storage box for collecting a bill stain on which is detected by the identification section 34 and temporarily storing the stained bill. A user such as a store manager having authority can detach the collection cassette 44 from the housing 31 and bring the collection cassette 44 from a register counter on which the POS terminal 2 is arranged to a place such as a back office of the store at which security is ensured while the stained bill is stored in the collection cassette 44.

The conveyance section 36 functions as a money depositing conveyance module for conveying a bill from the money depositing port 32*a* to each storage box (the first storage box 41, the second storage box 42, the third storage box 43 and the collection cassette 44) of the storage section 35. Further, the conveyance section 36 functions as a money dispensing conveyance module for conveying a bill from each storage box (the first storage box 41, the second storage box 42 and the third storage box 43) for paying out of the storage section 35 to the money dispensing port 33*a*.

The conveyance section 36 equipped with, for example, an endless conveyance belt, rotates the conveyance belt in a forward or reverse direction to convey the bill on the conveyance belt in a forward or reverse direction. The forward direction refers to a direction from the near side to the far side of the housing 31, i.e., a direction from the acquiring section 32 side to the first storage box 41 side. The reverse direction refers to a direction from the far side to the near side of the housing 31, i.e., a direction from the first storage box 41 side to the money dispensing section 33 side.

At the time of depositing money, the conveyance section 36 drives the conveyance belt in the forward direction to carry bill acquired in the housing 31 by the acquiring section 32 to each storage box (the first storage box 41, the second storage box 42, the third storage box 43 and the collection cassette 44) of the storage section 35.

At the time of dispensing money, the conveyance section 36 drives the conveyance belt in the reverse direction to carry out bill for paying out from each storage box to the money dispensing port 33*a*. Each storage box for paying out refers to each storage box except the collection cassette 44, that is, the first storage box 41, the second storage box 42 and third storage box 43.

Further, at the time of depositing and dispensing money, the rotation direction of the conveyance belt is switched, and one conveyance belt is used for both a money depositing conveyance and a money dispensing conveyance; however, the embodiment is not limited to this. A belt for money depositing conveyance and a belt for money dispensing conveyance may be separately arranged as another constitution.

Figure 3:
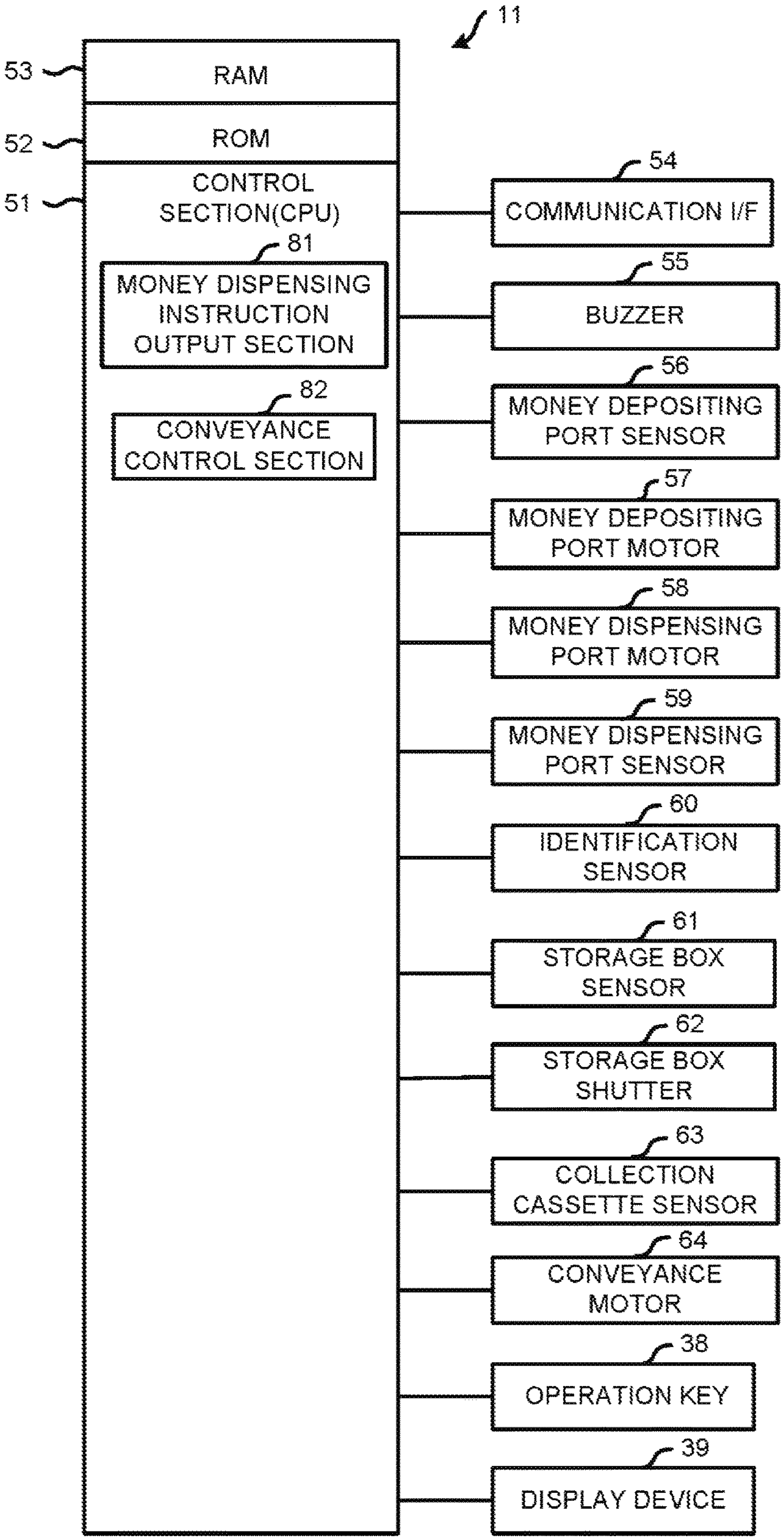
FIG. 3 is a block diagram illustrating an electrical connection of each section of the bill change machine.

FIG. 3 is block diagram illustrating an electrical connection of each section of the bill change machine 11. The bill change machine 11 includes a control section 51 constituted by a processor such as a CPU (Central Processing Unit) inside the housing 31. The control section 51 is connected with a ROM (Read Only Memory) 52 and a RAM (Random Access Memory) 53 through a bus line.

The control section 51 is connected with each of a communication I/F (Interface) 54, a buzzer 55, a money depositing port sensor 56, a money depositing port motor 57, a money dispensing port motor 58, a money dispensing port sensor 59, the identification sensor 60, a storage box sensor 61, a storage box shutter 62, a collection cassette sensor 63 and conveyance motor 64 through a bus line and various interfaces. Further, the control section 51 is connected with the operation key 38 and the display device 39 (refer to FIG. 1 together) through a bus line and various interfaces.

The control section 51 carries out an error notification processing to enable the buzzer 55 to output an error sound at the time an error occurs. The money depositing port sensor 56, arranged at the money depositing port 32*a* (refer to FIG. 2), detects the insertion of a bill into the money depositing port 32*a*. The money depositing port motor 57, if the bill is detected by the money depositing port sensor 56, drives a roller arranged at the money depositing port 32*a* to send out the bill inserted into the money depositing port 32*a* to the conveyance section 36.

The money dispensing port motor 58 drives a roller arranged at the money dispensing port 33*a* (refer to FIG. 2) to send out the bill conveyed from the conveyance section 36 to the money dispensing section 33 to the outside of the money dispensing port 33*a*. The money dispensing port sensor 59, arranged at the money dispensing port 33*a*, detects whether or not the bill sent to the money dispensing port 33*a* is pulled out from the money dispensing port 33*a*.

The identification sensor 60 is arranged at the identification section 34 (refer to FIG. 2). For example, a light receiving sensor for receiving the reflected light from the bill as stated above can be used as the identification sensor 60.

The storage box sensors 61 are respectively arranged at money depositing and dispensing ports of storage boxes of the storage section 35 (refer to FIG. 2), i.e., the first storage box 41, the second storage box 42, the third storage box 43 and the collection cassette 44. The storage box sensor 61, at the time of depositing money, sums up the number of the bills sent to each storage box (the first storage box 41, the second storage box 42, the third storage box 43 and the collection cassette 44) from the conveyance section 36. Moreover, the storage box sensor 61, at the time of dispensing money, sums up the number of the bills sent to the conveyance section 36 from each storage box (the first storage box 41, the second storage box 42 and the third storage box 43) except the collection cassette 44.

Each storage box shutter 62 is arranged at the money depositing and dispensing port of each storage box of the storage section 35 (refer to FIG. 2). The storage box shutter 62 of each storage box is opened when a bill is sent to the conveyance section 36 from each storage box and when a bill is carried into each storage box from the conveyance section 36, and is capable of sending out/carrying the bill.

The collection cassette sensor 63 is arranged on the inner wall surface of a storage frame section that stores the collection cassette 44 in the storage section 35 (refer to FIG. 2). The collection cassette sensor 63 detects that the collection cassette 44 is housed in the storage section 35 or is detached from the housing (storage section 35).

The conveyance motor 64, arranged at the conveyance section 36 (refer to FIG. 2), enables the conveyance belt of the conveyance section 36 to rotate in either the forward direction or the reverse direction.

The operation key 38 (refer to FIG. 1) receives a money dispensing instruction, an error releasing instruction and various setting operations. The display device 39 (refer to FIG. 1) displays various kinds of information such as a total balance amount stored in the storage section 35, a number of stored bills (a number of remaining bills) in each denomination, an error message, a money depositing amount and a money dispensing amount.

The ROM 52 stores various programs executed by the control section 51 and various data. The RAM 53 temporarily stores programs and data when the control section 51 executes various programs. The control section 51 collectively controls each section of the bill change machine 11 by reading out the program stored in the ROM 52 to the RAM 53 to execute it.

The programs executed by the bill change machine 11 are incorporated in the ROM 52 in advance to be provided. The programs executed by the bill change machine 11 may be recorded in a computer-readable recording medium such as a CD-ROM, a FD (Flexible Disk), a CD-R, a DVD (Digital Versatile Disk) in the form of an installable or executable file to be provided.

Furthermore, the programs executed by the bill change machine 11 may be stored in a computer connected with a network such as an Internet and downloaded via the network to be provided. The programs executed by the bill change machine 11 may be provided or distributed via the network such as the Internet.

The programs executed by the bill change machine 11 functions as each section (a money dispensing instruction output section 81 and a conveyance control section 82) and, as in the actual hardware, each section is generated on the main storage device through the execution of the programs read from the ROM 52 by the CPU (processor).

The money dispensing instruction output section 81 receives a money dispensing instruction notified from a control section 71 of the POS terminal 2. The POS terminal 2 notifies, for example, the bill change machine 11 of the amount paid by bills within the change amount as the money dispensing instruction. The money dispensing instruction output section 81 receives the money dispensing instruction even when the money dispensing amount is input from the operation key 38. The money dispensing instruction output section 81 determines the amount of dispensed money of each denomination according to the money dispensing total amount and outputs the determined amount of dispensed money to the storage box of each denomination (the first storage box 41, the second storage box 42 and the third storage box 43).

The conveyance control section 82 collectively controls the operation of each mechanism of the conveyance section 36. For example, the conveyance control section 82 controls the driving of the conveyance motor 64 to enable the conveyance belt of the conveyance section 36 to rotate in a forward or reverse direction. In this way, the conveyance control section 82 switches the conveyance direction of the bill at the time of depositing or dispensing money.

The conveyance control section 82 controls the conveyance section 36 to discharge a bill identified as a counterfeit bill by the identification section 34 from the money dispensing port 33*a* as a reject bill. The conveyance control section 82 controls the conveyance section 36 to convey a bill identified as a genuine bill by the identification section 34 to one of the storage boxes of the storage section 35 based on the identification result of the identification section 34.

More specifically, the conveyance section 36 carries the bill with stain determined by the identification section 34 to the collection cassette 44 to collect it so that the bill with stain is not used for paying out.

Further, the conveyance section 36 carries a bill with less stain determined by the identification section 34 to one of the first storage box 41, the second storage box 42 and the third storage box 43 by denominations. That is, the conveyance section 36 carries the bill identified as a first denomination by the identification section 34 to the first storage box 41. The conveyance section 36 carries the bill identified as a second denomination by the identification section 34 to the second storage box 42. The conveyance section 36 carries the bill identified as a third denomination by the identification section 34 to the third storage box 43.

The conveyance control section 82 controls the conveyance section 36 to move bills having denomination and number thereof instructed from the first storage box 41, the second storage box 42 and the third storage box 43 into the collection cassette 44 according to a collection instruction received through the operation key 38.

Figure 4:
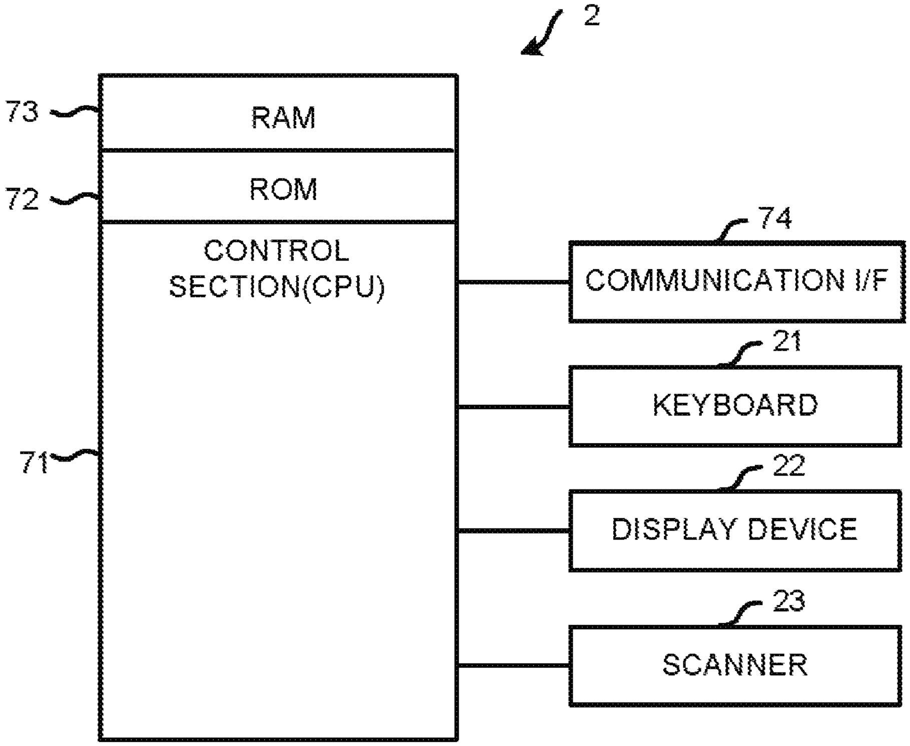
FIG. 4 is a block diagram illustrating the functional structure of the POS terminal.

FIG. 4 is a block diagram illustrating the functional structure of the POS terminal 2. The POS terminal 2 is equipped with a control section 71, a ROM 72 and a RAM 73. The ROM 72 stores various programs executed by the control section 71 and various data. The RAM 73 temporarily stores data and programs executed by the control section 71. A processor such as a CPU is used as the control section 71. The control section 71 collectively controls each section of the POS terminal 2 through reading out the program stored in the ROM 72 to the RAM 73 to execute it.

Further, the control section 71 is connected with the communication I/F 74 via a bus line. The communication I/F 74 is an interface for transmitting/receiving data to/from the change machine 1. The control section 71 is connected with I/O devices such as the keyboard 21 (refer to FIG. 1), the display device 22 (refer to FIG. 1) and the scanner 23 via the bus line. The scanner 23 reads a commodity code attached to each commodity in the form of a barcode or a two-dimension code.

The control section 71 inquires, if the scanner 23 reads the commodity code, the read commodity code of a commodity master file to read commodity information (such as unit price) of the commodity specified with the commodity code. The commodity master file may be stored in a store server connected with the POS terminal 2 through a connection circuit such as a LAN (Local Area Network). Moreover, the control section 71 may inquire the commodity information of the commodity master file via a connection circuit. Alternatively, the control section 71 downloads the commodity master file from the store server to store it in the POS terminal 2 and may inquire the commodity information of the commodity master file serving as a storage destination.

The control section 71 calculates a total amount of one transaction, according to the unit price and the sales quantity of each commodity, to carry out a settlement processing. Further, the control section 71 generates sales data of the transaction with the use of the commodity information of the transaction content and the information such as a price, quantity, total amount, deposited amount and change amount. Then, the control section 71 sends the sales data to the store server at a specific timing and registers the sales data in a sales master file managed by the store server.

Next, the settlement processing carried out through the cooperation of the POS terminal 2 with the change machine 1 is described. The control section 71 of the POS terminal 2 displays the total amount of one transaction on the display device 22. The customer refers to the displayed amount to pay the total amount in cash to the store clerk. The store clerk inserts the bills in the payment (cash) received from the customer into the money depositing port 32*a* of the bill change machine 11. The store clerk also puts the coins in the payment received from the customer into the money depositing port 46*a* of the coin change machine 12. The bills inserted into the money depositing port 32*a* are acquired by the conveyance section 36 inside the housing 31 with the money depositing port motor 57, and an authenticity determination, a denomination identification and a stain detection are carried out for the bills by the identification section 34.

The conveyance control section 82 collects the bill with stain determined by the identification section 34 to the collection cassette 44 through the conveyance section 36. The conveyance control section 82, through the conveyance section 36, stores the bill with less stain determined by the identification section 34 in one of the first storage box 41, the second storage box 42 and the third storage box 43 in correspondence to the denomination identified by the identification section 34.

The bill change machine 11 and the coin change machine 12 respectively calculate bill depositing amount and coin depositing amount and individually notify the calculated amount to the POS terminal 2. The bill change machine 11 calculates the bill depositing amount on the basis of the denomination and the number of bills identified by the identification section 34. At this time, the bill change machine 11 also calculates, even for the bill, of which stain is detected, collected in the collection cassette 44, the bill depositing amount thereof as a depositing bill and includes its denomination and number of bills to all the bill depositing amount.

The control section 71 of the POS terminal 2 subtracts the total amount of commodity prices from a total of the notified bill depositing amount and the notified coin depositing amount to calculate the change amount. Then, the control section 71 of the POS terminal 2 notifies the bill change machine 11 of the amount of bills within the change amount, paid to the customer, which is contained in the money dispensing instruction. Further, the control section 71 also notifies the coin change machine 12 of the amount of coins, paid to the customer, which is contained in the money dispensing instruction. The control section 71 prints a receipt through a printer.

The coin change machine 12 dispenses coins of the notified dispensing amount according to the money dispensing instruction from the POS terminal 2. The bill change machine 11 also dispenses bills of the notified dispensing amount according to the money dispensing instruction from the POS terminal 2. The store clerk hands over the bills and coins dispensed as change and a receipt to the customer. In this way, the settlement of one transaction is completed.

As stated above, the bill change machine 11 carries the bills of which no stain is detected to the storage section 35 which stores bills for paying out, and collects the bills of which stain is detected in the collection cassette 44. In this way, the bill with stain is treated as a depositing bill but is not paid to a customer as change. Thus, it can save the troublesome operation in which the store clerk removes the bill with stain and changes to the bill with no stain to hand over it to the customer, and thus the enhancement of the service quality is achieved without any troublesome operation.

Further, the bill change machine 11 treats the bill with stain as a depositing bill without rejecting (sending back) the bill with stain to calculate the bill depositing amount. The store collects the bill with stain but not hands over it to the customer, and thus the customer does not feel inconvenience.

The bill change machine 11 identifies a bill with stain and collects it immediately after depositing the bill, and thus a bill can directly be conveyed from the storage box to the money dispensing port 33*a*, as similar to the conventional money dispensing processing. Further, the time required until the store clerk hands over the change to the customer can be almost the same extent to that in the conventional processing.

As stated above, it is exemplified that the bill having stain is detected and collected at the time of depositing the bill; however, the timing of collecting the bill having stain is not limited to this. As another example, the bill having stain may be detected and collected at the time of dispensing the bill.

An Example of the Configuration in a Case of Collecting Bill with Stain at the Time of Dispensing Bill The first storage box 41, the second storage box 42 and the third storage box 43 send out the bills of each denomination to the conveyance section 36 according to the money dispensing instruction from the money dispensing instruction output section 81. The conveyance control section 82 enables the conveyance motor 64 to rotate in reverse direction to drive the conveyance belt in the reverse direction, and conveys the bills sent out from each storage box one by one to a position where the identification section 34 is arranged.

The bill of which stain less than a specified degree is detected by the identification section 34 is conveyed to the money dispensing port 33*a* by the conveyance section 36, and is sent to the money dispensing port 33*a* through the cooperation with the money dispensing port motor 58.

On the other hand, the conveyance control section 82 controls the conveyance section 36 to send the bill of which stain more than the specified level is detected by the identification section 34 to the collection cassette 44 without feeding the bill having much stain to the money dispensing port 33*a*. Then, the identification section 34 notifies the money dispensing instruction output section 81 of the denomination of the bill of which much stain is detected. The storage box sensor 61 arranged in the collection cassette 44 notifies the money dispensing instruction output section 81 of the number of the collected bills. The money dispensing instruction output section 81 newly outputs the money dispensing instruction containing the denomination and the number of the bills notified. Then, the storage box of each denomination (the first storage box 41, the second storage box 42 and the third storage box 43) and the conveyance section 36 dispense the bills corresponding to the collected bills again. In this way, the bill change machine 11 controls to compensate the amount corresponding to collected bills to dispense all the original change amounts.

In this way, even if the bills having much stain are collected at the time of dispensing money, as similar to the above, it can be performed that the bills having much stain are not accidentally contained in the change handed over to the customer.

Another Example of the Configuration of the Collection Section

As stated above, one collection cassette 44 is arranged in the storage section 35, and the bills having much stain are collected in the collection cassette 44 regardless of its denomination; however, a plurality of the collection sections may be arranged by each denomination to separately collect bills by each denomination. In FIG. 2, it is exemplified that the collection cassette 44 is arranged at the front or near side of the storage section 35 but the collection cassette 44 may be arranged at the rear or far side of the storage section 35, for example, at the rear side of the first storage box 41.

An Example Applicable to the Coin Change Machine 12

As stated above, an example of detecting and collecting the bill having much stain through the bill change machine 11 is described; however, a coin having much stain may be detected and collected by the coin change machine 12. The stain of coin may be detected with the use of the light receiving sensor as being similar to that described above or another sensor such as a material sensor.

The collection section for collecting coin having much stain may use a drawer box arranged at the lower portion of a coin conveyance route (for example, refer to the structure recorded in Japanese Unexamined Patent Application Publication No. 5620442). As an example, if the identification section detects the coin having much stain, a shutter arranged at the conveyance route is opened and the coin having much stain that is being conveyed falls in the drawer box arranged at the lower portion of the conveyance route. In this way, as similar to the bill collecting processing, even if it is determined that the coin has much, stain, it is allowed to be deposited; however, the coil having stain can be collected in the collection section without being stored in the storage section. Therefore, the coin having much stain cannot be accidentally dispensed as change.

An Example of Configuration of Another Device

As stated above, it is exemplified that the cash processing apparatus of the present invention is applied to the change machine 1 (the bill change machine 11 or the coin change machine 12) connected with the POS terminal 2; however, the embodiment is not limited to this. For example, a money depositing/dispensing device arranged in an ATM (Automated Teller Machine) may be used as the cash processing apparatus of the present invention. Further, the foregoing structure may be applied to a cash processing apparatus for carrying out either of depositing money and dispensing money.

As another embodiment, the present invention described above may be applied to an apparatus equipped with both the functional structure of the change machine 1 and the functional structure of the POS terminal 2. As an example of such an apparatus, a self-checkout apparatus (hereinafter, simply referred to as a "self-POS terminal") used in a store such as a supermarket and a convenience store can be utilized.

Figure 5:
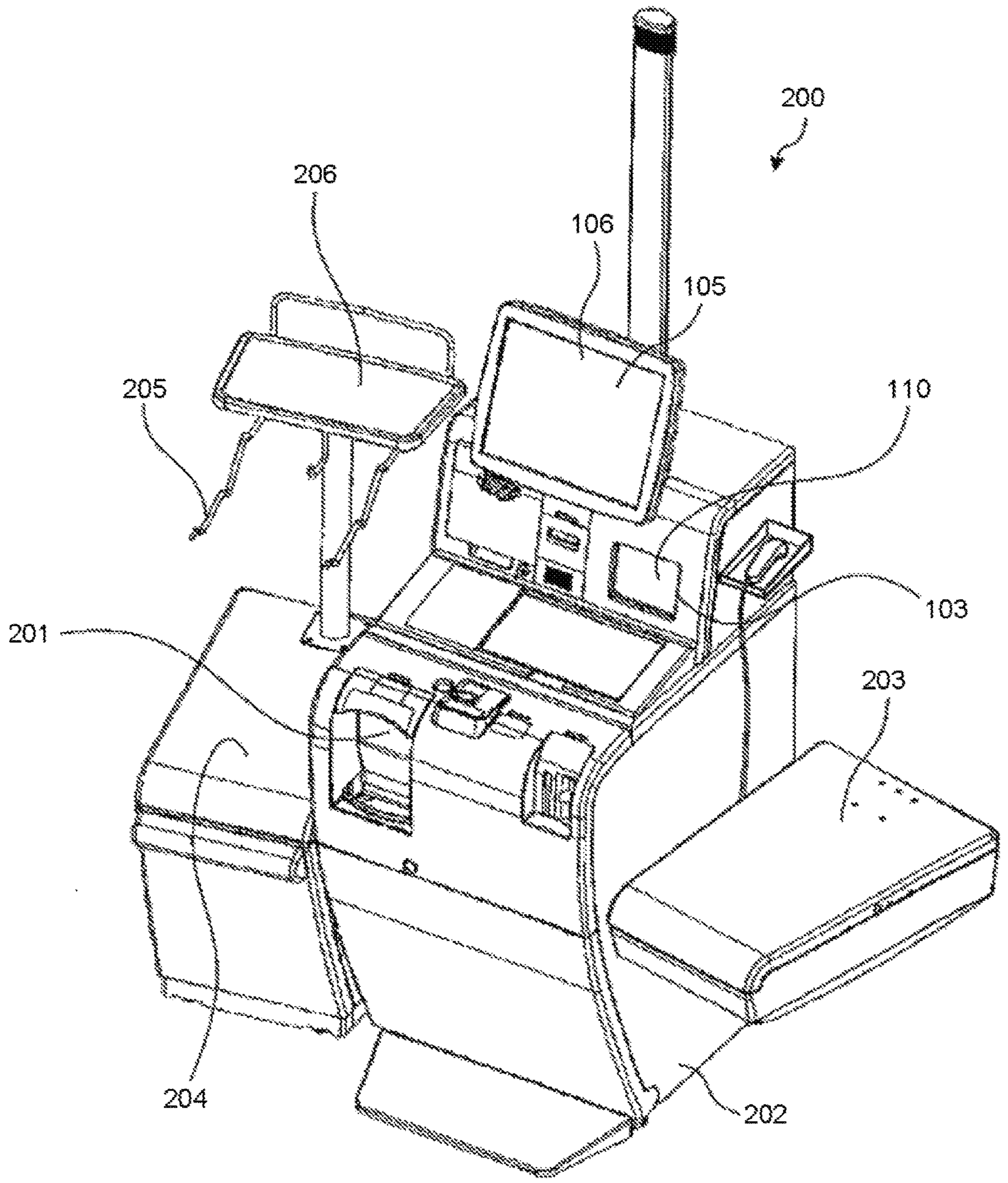
FIG. 5 is an external perspective view illustrating the schematic structure of a self-POS terminal according to another embodiment.

FIG. 5 is an external perspective view illustrating the schematic structure of a self-POS terminal 200 according to another embodiment. As shown in FIG. 5, a main body 202 of the self-POS terminal 200 is equipped with a display device 106 arranged at the surface of a touch panel 105 and a commodity reading section 110 for capturing a commodity image to recognize (detect) the category of a commodity.

A liquid crystal display device is used as the display device 106, for example. The display device 106 displays a guidance screen for notifying a customer of the operation method of the self-POS terminal 200, various input screens, a registration screen for displaying information of the commodity captured by the commodity reading section 110 and a settlement screen for displaying total amount and deposited amount of the commodity to select a payment method.

The commodity reading section 110 reads the commodity image through an image capturing section arranged inside the reading window 103 while the customer holds a code symbol attached to the commodity over the reading window 103 of the commodity reading section 110.

Further, a commodity placing table 203 for placing unsettled commodities input in a basket is arranged at the right side of the main body 202. A commodity placing table 204 for placing settled commodities is arranged at the left side of the main body 202. A temporary placing table 206 for temporarily placing settled but not bagged commodities is arranged at the upper surface of the commodity placing table 204 in a protruding manner. A pair of bag hooks 205 for hooking bags in which the settled commodities are put is arranged at the near side end part of the temporary placing table 206. The commodity placing tables 203 and 204 both include a weighing scale which has a function of confirming whether or not the weight of the commodity before the settlement is the same as that after the settlement.

Further, a change machine 201 is arranged in the main body 202 of the self-POS terminal 200 to deposit the bill for settlement and receive the change bill.

In the self-POS terminal 200 with such a structure described above, the functional structure of the foregoing change machine 1 (refer to FIG. 1 to FIG. 3) may be applied to the change machine 201. The functional structure of the foregoing POS terminal 2 (refer to FIG. 1 and FIG. 5) may be applied to the self-POS terminal 200.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

As described above, the cash processing apparatus (as an example, change machine 1) of the present embodiment collects the money of which much stain is detected in the collection section without paying out the money having much stain to the money dispensing port. Thus, according to the present embodiment, the cash processing apparatus can be provided that does not dispense the stained money.

What is claimed is:

1. A cash processing apparatus, comprising:

a storage section configured to store money by denominations for paying out;

a money depositing conveyance module configured to convey stained money and non-stained money from a money depositing port to the storage section;

a money dispensing conveyance module configured to convey money from the storage section to a money dispensing port;

a money dispensing instruction module configured to instruct a denomination and the amount of the money to be paid out from the money dispensing port;

a paying out module configured to pay out money of the instructed amount from the storage section according to an instruction of the money dispensing instruction module;

a detection module configured to detect stain of the money conveyed by the money dispensing conveyance module; and a collection module configured to collect the money of which stain is detected by the detection module in the collection section without paying out it to the money dispensing port, and to calculate the denomination and the amount of the collected money, and wherein the paying out module is further configured to pay out money corresponding to the calculated denomination and amount of the money collected by the collection module.

2. The cash processing apparatus according to claim 1, wherein the collection section includes a collection box arranged detachably with respect to the collection section.

3. The cash processing apparatus according to claim 2, further comprising a setting module configured to set a detection level which is used by the identification module at the time of detecting stain of the money, wherein the identification module detects stain of the money according to the detection level set by the setting module.

4. The cash processing apparatus according to claim 1, further comprising a setting module configured to set a detection level which is used by an identification module at the time of detecting stain of the money, wherein the identification module detects stain of the money according to the detection level set by the setting module.

5. The cash processing apparatus according to claim 1, further comprising a calculation module configured to calculate the amount of the money collected in the collection section by the money depositing conveyance module.

6. The cash processing apparatus according to claim 1, wherein the identification module includes a sensor for receiving a light reflected from the money to detect stain of the money according to the receiving amount of the light reflected from the money.

7. A cash processing method, comprising:

storing money in a storage section by denominations for paying out;

conveying, by a money depositing conveyance module, stained money and non-stained money from a money depositing port to the storage section;

conveying, by a money dispensing conveyance module, money from the storage section to a money dispensing port;

instructing, by a money dispensing instruction module, a denomination and the amount of the money to be paid out from the money dispensing port;

paying out, by a paying out module, money of the instructed amount from the storage section according to an instruction of the money dispensing instruction module;

detecting, by a detection module, stain of the money conveyed by the money dispensing conveyance module; and collecting, by a collection module, the money of which stain is detected by the detection module in the collection section without paying out it to the money dispensing port, and calculating, by the collection module, the denomination and the amount of the collected money, wherein in the paying out, money, which corresponds to the calculated denomination and amount of the money collected by the collection module, is paid out.

8. The cash processing method according to claim 7, wherein the collection section includes a collection box arranged detachably with respect to the collection section.

9. The cash processing method according to claim 8, further comprising setting, by a setting module, a detection level which is used by an identification module at the time of detecting stain of the money, wherein stain of the money is detected by the identification module according to the detection level set by the setting module.

10. The cash processing method according to claim 7, further comprising setting, by a setting module, a detection level which is used by an identification module at the time of detecting stain of the money, wherein stain of the money is detected by the identification module according to the detection level set by the setting module.

11. The cash processing method according to claim 7, further comprising calculating, by a calculation module, the amount of the money collected in the collection section by the money depositing conveyance module.

12. The cash processing method according to claim 7, wherein the identification module includes a sensor for receiving a light reflected from the money to detect stain of the money according to the receiving amount of the light reflected from the money.

* * * * *